United States Patent
Wang et al.

(10) Patent No.: US 7,054,151 B2
(45) Date of Patent: May 30, 2006

(54) STORAGE DEVICE MOUNTING APPARATUS

(75) Inventors: Li-Yuan Wang, Tu-Chen (TW); Yuan-Lin Hsu, Tu-Chen (TW); Li-Ping Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 54 days.

(21) Appl. No.: 10/663,012

(22) Filed: Sep. 15, 2003

(65) Prior Publication Data
US 2005/0280983 A1 Dec. 22, 2005

(30) Foreign Application Priority Data
Mar. 28, 2003 (TW) .............. 92204910 U

(51) Int. Cl.
*G06F 1/16* (2006.01)

(52) U.S. Cl. ............ 361/685; 312/223.1; 312/223.2

(58) Field of Classification Search ........ 361/683–685, 361/724–730; 312/223.1, 223.2, 333
See application file for complete search history.

(56) References Cited

U.S. PATENT DOCUMENTS

| | | | | |
|---|---|---|---|---|
| 5,319,519 A | * | 6/1994 | Sheppard et al. | ........... 361/685 |
| 5,510,955 A | * | 4/1996 | Taesang | ....................... 361/685 |
| 6,238,026 B1 | * | 5/2001 | Adams et al. | ........... 312/223.2 |
| 6,556,528 B1 | * | 4/2003 | Kuang | ......................... 720/657 |
| 6,646,870 B1 | * | 11/2003 | Shih | .......................... 361/685 |
| 2002/0172014 A1 | * | 11/2002 | Lung | .......................... 361/725 |

FOREIGN PATENT DOCUMENTS

TW           517930          1/2003

* cited by examiner

*Primary Examiner*—Lynn Feild
*Assistant Examiner*—Anthony Q. Edwards
(74) *Attorney, Agent, or Firm*—Wei Te Chung

(57) ABSTRACT

A storage device mounting apparatus includes a first slider (20) having a catch (26), a second slider (30) having a cutout (35), a bracket (40) and a fastener (50). The bracket defines an opening (42) in a front plate (41) thereof. The bracket forms a guideway (45) having an aperture (47), a rail (46) and a stop (49) from a bottom plate (44) thereof corresponding to the opening. In assembly, the sliders are attached to opposite sides of a storage device (10). The storage device is inserted into the bracket through the opening, the first slider sliding along the guideway and the second slider sliding the rail. The catch of the first slider engages in the aperture of the guideway, the cutout of the second slider engagingly receives the stop, and the fastener secures the first slider to the guideway.

18 Claims, 5 Drawing Sheets

STORAGE DEVICE MOUNTING APPARATUS

BACKGROUND OF THE INVENTION

1. Field of the Invention

The present invention relates to storage device mounting apparatuses for securing items such as data storage devices, and more particularly to a storage device mounting apparatus which conveniently and readily mounts a storage device.

2. Related Art

A typical personal computer invariably comprises one or more data storage devices for communication and handling of data. Such data storage devices include, but are not limited to, hard disk drives, floppy disk drives, and CD-ROM drives. These data storage devices usually comprises a rigid casing that is retained in a computer enclosure by means of bolts or rivets or catches.

Taiwan Patent Application No. 89209805 discloses a data storage device mounting means which utilizes couples of screws and locating means for securing a data storage device in an enclosure. The enclosure comprises a bottom plate and a side plate. The side plate forms a plurality of locating catches extending from an inner side thereof. The bottom plate comprises a pair of slots and a pair of upright tabs. The storage device defines a plurality of locating apertures in both side thereof. A board is attached to an outside surface of the storage device. The board extrudes a pair of outward bars form a bottom edge and a plurality of inward locating catches from an inner side thereof. In assembly, the storage device is inserted into the enclosure along the side plate. When the storage device reaches the upright tabs, the locating catches of the enclosure engages in the apertures of the storage device, the locating bars of the board pivotally engaging in the slot of the bottom plate. A screw is then extended through the board to engage with the storage device. However, all the mounting or dismounting operation must be completed in the enclosure. It is apt to damage some components in the enclosure.

An improved data storage device mounting means which overcomes these problems is desired.

SUMMARY OF THE INVENTION

Accordingly, a main object of the present invention is to provide a mounting apparatus for safely and effectively mounting and retaining a data storage device.

To achieve the above object, a storage device mounting apparatus of the present invention includes a first slider having a catch, a second slider having a cutout, a bracket and a fastener. The bracket defines an opening in a front plate thereof. The bracket forms a guideway having an aperture, a rail and a stop from a bottom plate thereof corresponding to the opening. In assembly, the sliders are attached to opposite side of a storage device. The storage device is inserted into the bracket through the opening, the first slider sliding along the guideway and the second slider sliding the rail. The catch of the first slider engages in the aperture of the guideway, the cutout of the second slider engagingly receives the stop and the fastener secures the first slider to the guideway.

Other objects, advantages and novel features of the present invention will be drawn from the following detailed description of preferred embodiments of the present invention with the attached drawings, in which:

DESCRIPTION OF THE PREFERRED EMBODIMENT

Figure 1:
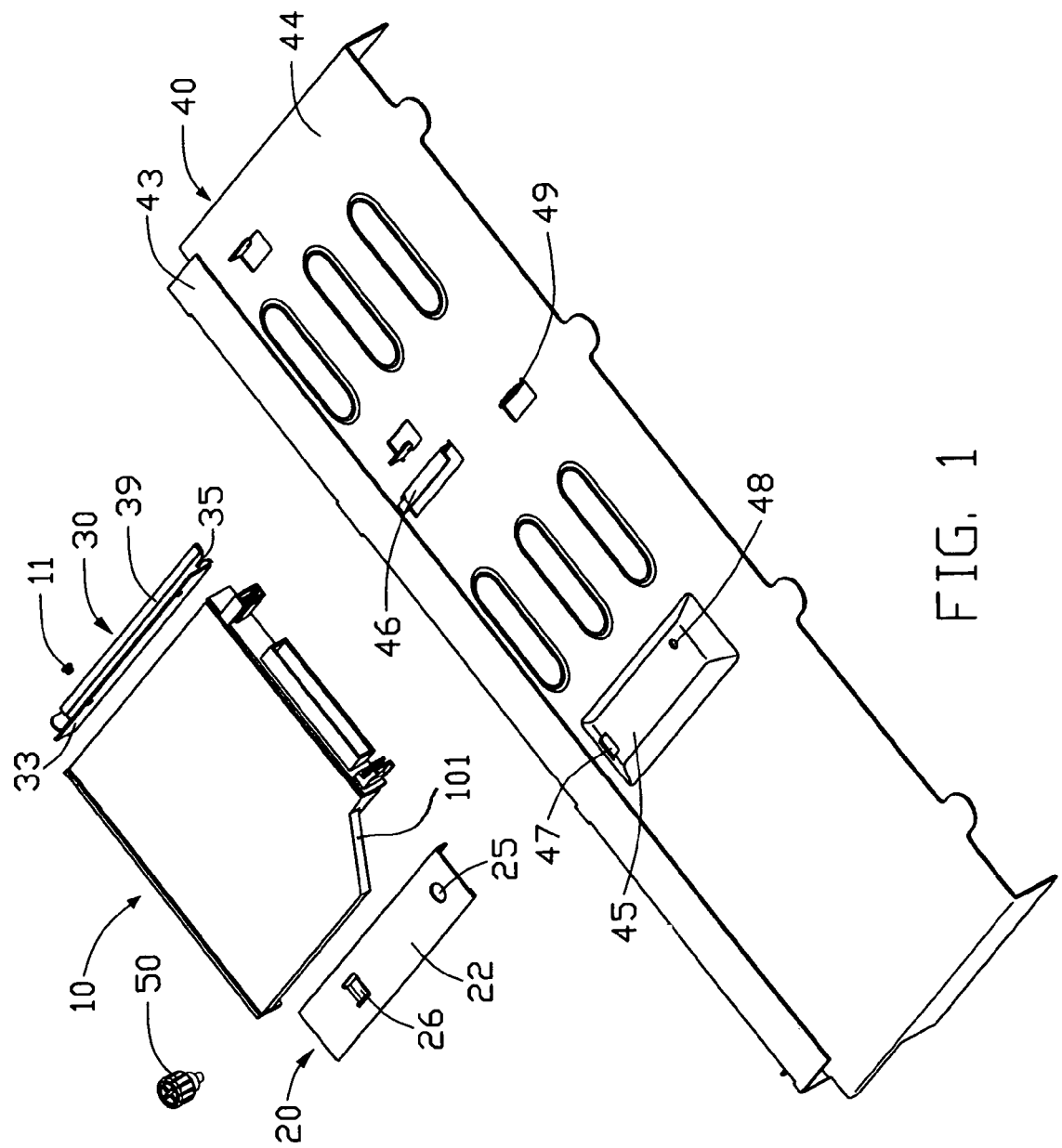
FIG. 1 is an exploded, isometric view of a storage device mounting apparatus in accordance with the present invention, together with a data storage device.

Referring to FIG. 1, a storage device mounting apparatus in accordance with the present invention comprises a first slider 20, a second slider 30, a bracket 40 and a fastener 50.

The storage device mounting apparatus is for mounting a data storage device 10 therein. The storage device 10 defines a pair of threaded holes (not shown) in each of opposite side walls thereof, and said storage device 10 defines a cutout 101 around one corner thereof.

Figure 2:
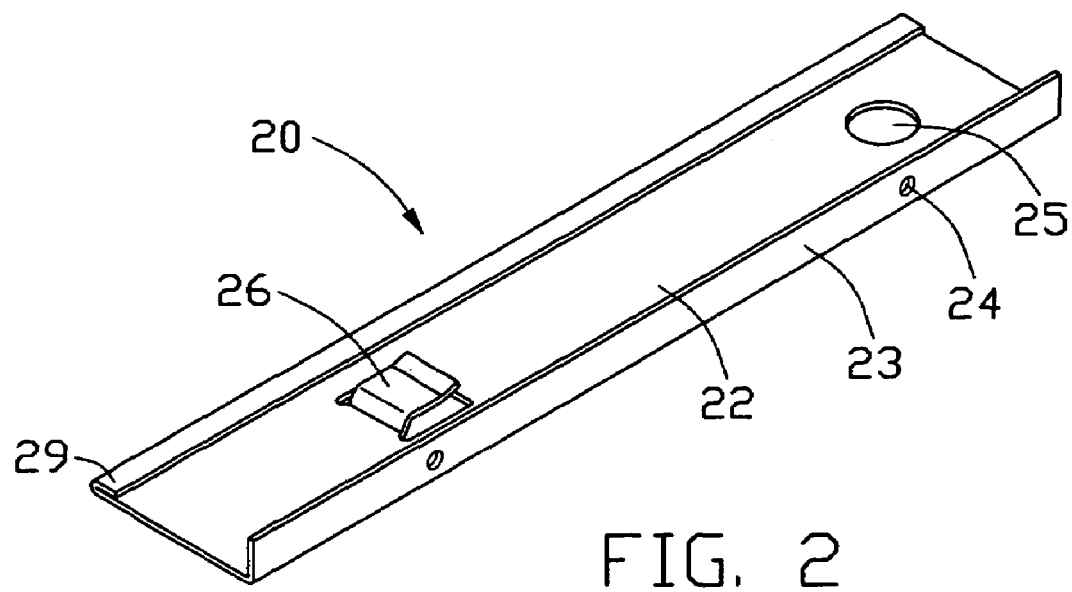
FIG. 2 is an enlarged, isometric view of a first slider of the storage device mounting apparatus of FIG. 1, but showing the slider inverted.

Referring also to FIG. 2, the first slider 20 comprises a first main body 22. An L-shaped slant catch 26 depends from the first main body 22. A through hole 25 is defined in one end of the first main body 22. A vertical strip 23 depends from a longitudinal inner side edge of the first main body 22. The vertical strip 23 defines a pair of first fixing holes 24 therein. A horizontal strip 29 is bent inwardly from an opposite longitudinal outer side edge portion of the first main body 22, such that the horizontal strip 29 is doubled over and abuts a lower surface of the first main body 22.

Figure 3:
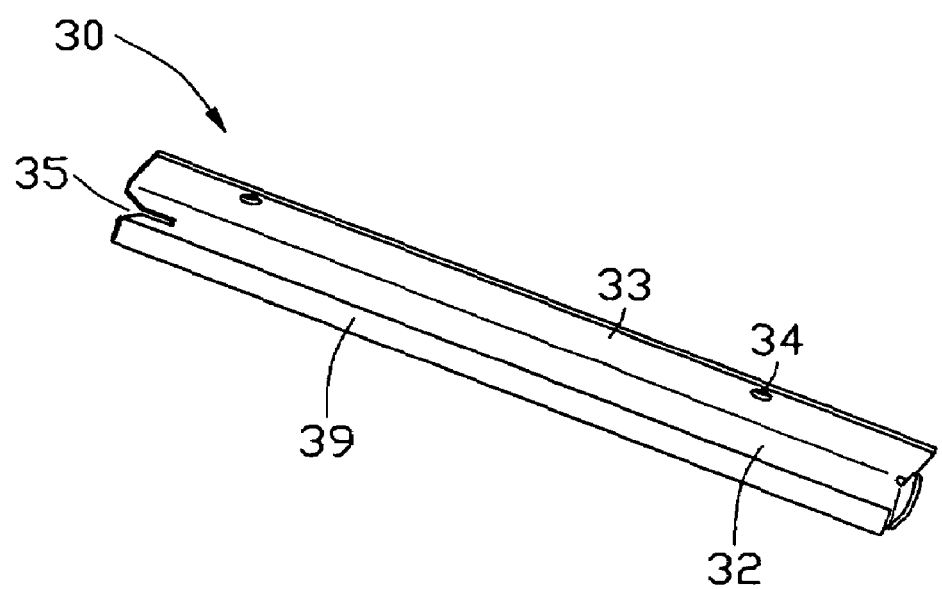
FIG. 3 is an enlarged, isometric view of a second slider of the storage device mounting apparatus of FIG. 1, but viewed from another aspect.

Referring also to FIG. 3, the second slider 30 comprises a second main body 32. The second main body 32 defines a cutout 35 in one end thereof. A second vertical strip 33 extends upwardly from a longitudinal inner side edge of the second main body 32. A pair of second fixing holes 34 is defined in the vertical strip 33. A second horizontal strip 39 is bent inwardly from an opposite longitudinal outer side edge portion of the second main body 32, such that the second horizontal strip 39 is doubled over and abuts an upper surface of the second main body 32.

Figure 4:
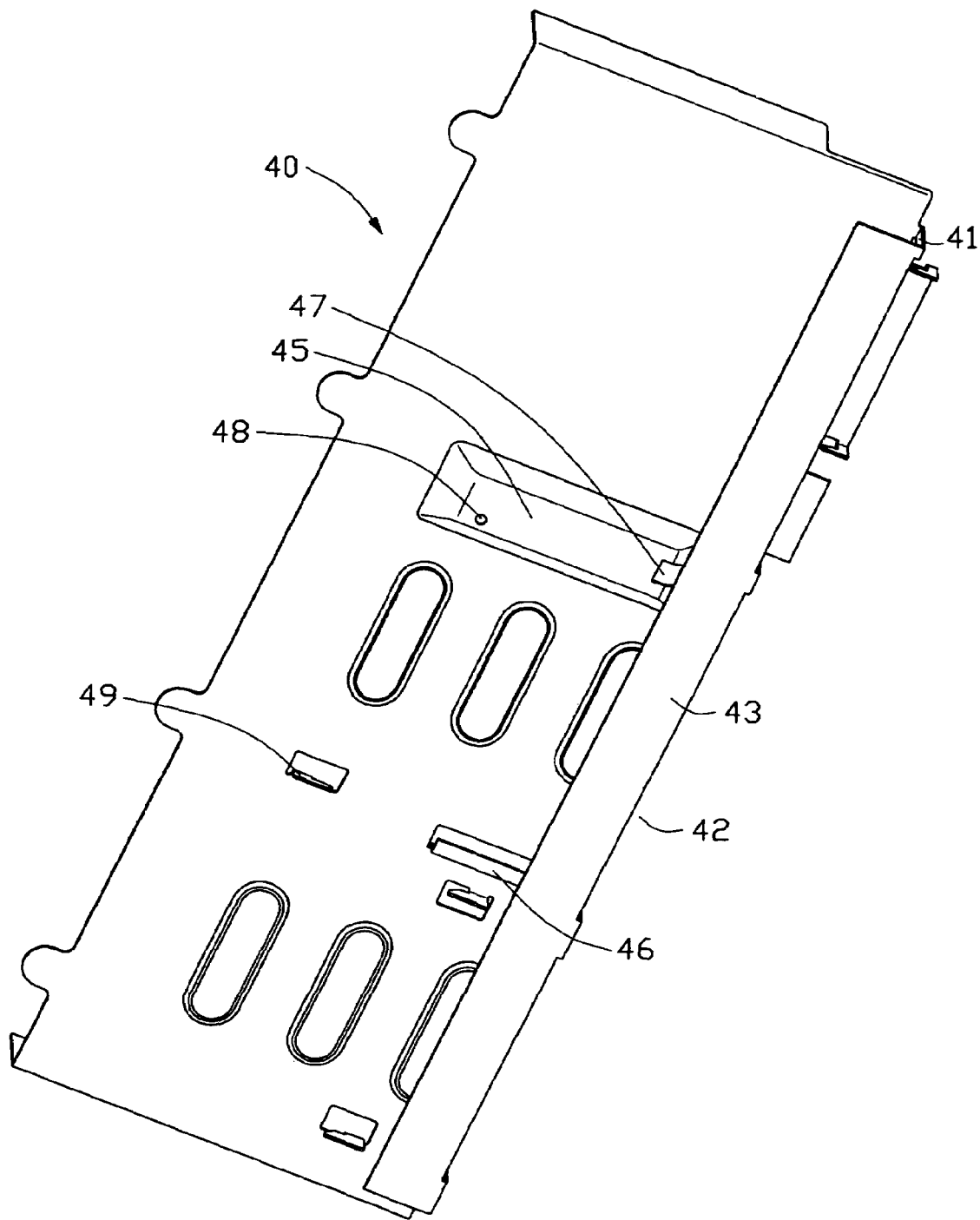
FIG. 4 is an enlarged, isometric view of a bracket of the storage device mounting apparatus of FIG. 1, but viewed from another aspect.

Referring also to FIG. 4, the bracket 40 comprises a front plate 41 and a bottom plate 44. The front plate 41 forms a horizontal flange 43 extending inwardly from a top edge thereof. An opening 42 is defined in the front plate 41, for access of the storage device 10 therethrough. The bottom plate 44 forms a raised guideway 45, and a rail 46 parallel to and opposite from the guideway 45. The guideway 45 and the rail 46 correspond to opposite sides of the opening 42 respectively. The guideway 45 defines an aperture 47 in an end thereof nearest the front plate 41, and a securing hole 48 in an opposite end thereof most distal from the front plate 41. A stop 49 extends upwardly from the bottom plate 44, in general alignment with the rail 46 and opposite from the guideway 45.

Figure 5:
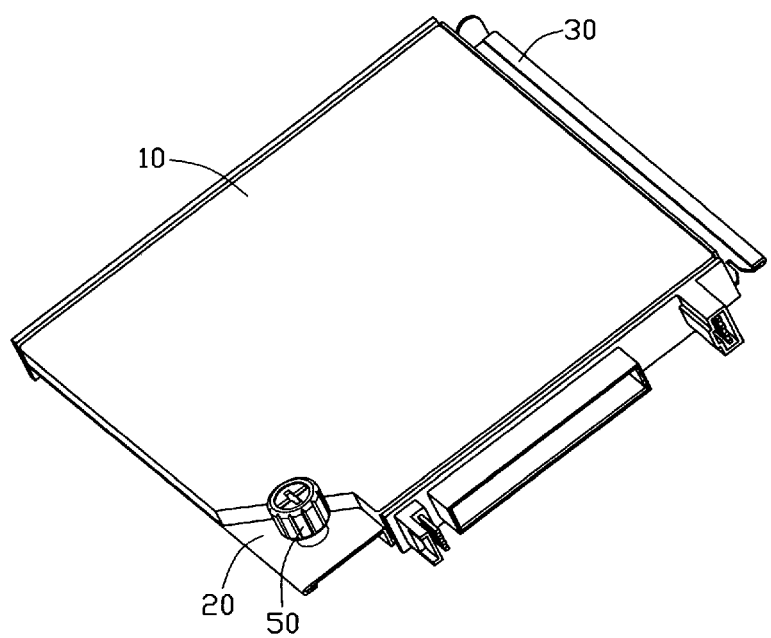
FIG. 5 is a partially assembled view of FIG. 1, not including the bracket.
Figure 6:
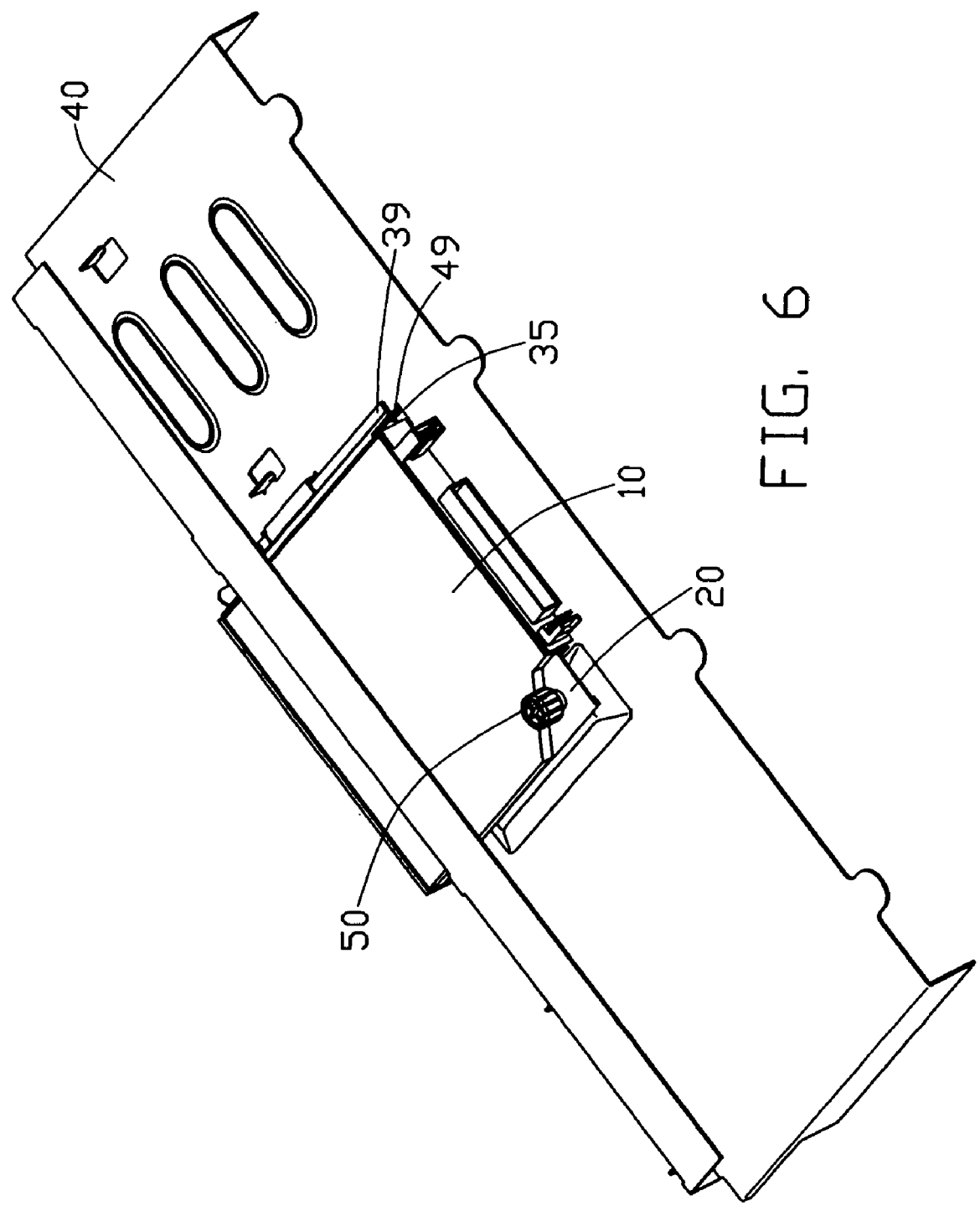
FIG. 6 is a fully assembled view of FIG. 1.

Referring to FIGS. 5 and 6, in assembly, the first and second sliders 20, 30 are attached to the storage device 10. Two fasteners such as screws 11 are extended through the first fixing holes 24 of the first vertical strip 23 and engaged in the thread holes of the corresponding side wall of the storage device 10. Another two fasteners such as screws 11 are extended through the second fixing holes 34 of the second vertical strip 33 and engaged in the thread holes of the corresponding side wall of the storage device 10. The combined storage device 10 and first and second sliders 20, 30 is inserted into the bracket 40 through the opening 42, with the first horizontal strip 29 of the first slider 20 sliding along the guideway 45 and the second horizontal strip 39 of the second slider 30 sliding along the rail 46. The storage device 10 is located to an inmost position in the bracket 40, with the catch 26 of the first slider 20 engaging in the aperture 47 of the guideway 45, and the cutout 35 of the second slider 30 engagingly receiving the stop 49 of the bottom plate 44. A fastener such as a thumbscrew 50 is extended through the through hole 25 of the first slider 20 to engage in the securing hole 48 of the bracket 40 wherein an operation head of the thumbscrew 50 is substantially located in the cutout 101 and vertically exposed to the exterior through said cutout 101.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

The invention claimed is:

1. A storage device mounting apparatus for mounting a storage device therein, comprising:
   a bracket adapted for accommodating the storage device, the bracket comprising a guideway, said guideway is raised from a bottom plate of the bracket;
   a first slider adapted to be attached to one side of the storage device and sliding along the guideway;
   a stop means for preventing over-insertion of the storage device into the bracket, the stop means is formed between the first slider and the guideway;
   a second slider adapted to be attached to an opposite side of the storage device; and
   a securing means for securing the storage device to the bracket.

2. The storage device mounting apparatus as described in claim 1, wherein the stop means comprises an aperture defined in the guideway and a catch formed on the first slider, the catch engaging in the aperture.

3. The storage device mounting apparatus as described in claim 2, wherein the bracket comprises a front plate and a bottom plate, and the front plate defines an opening for access of the storage device therethrough.

4. The storage device mounting apparatus as described in claim 3, wherein the guideway extends upwardly from the bottom plate of the bracket.

5. The storage device mounting apparatus as described in claim 3, wherein the bottom plate further comprises a rail parallel to the guideway, the guideway and the rail corresponding to opposite sides of the opening respectively.

6. The storage device mounting apparatus as described in claim 5, wherein the bracket forms a stop in general alignment with the rail, and the second slider defines a cutout in an end thereof, the cutout for engagingly receiving the stop.

7. The storage device mounting apparatus as described in claim 6, wherein the second slider forms a horizontal strip sliding along the rail of the bracket, and a vertical strip defining a pair of fixing holes therein.

8. The storage device mounting apparatus as described in claim 1, wherein the first slider forms a horizontal strip sliding along the guideway, and a vertical strip defining a pair fixing holes therein.

9. The storage device mounting apparatus as described in claim 1, wherein the first slider defines a through hole therein, the guideway defines a securing hole, and the securing means comprises a thumbscrew extending through the through hole of the first slider to engage in the securing hole of the guideway.

10. A storage device mounting apparatus assembly comprising:
    a storage device;
    a bracket accommodating the storage device therein, the bracket comprising a rail and a guideway opposite to the rail;
    a first slider attached to one side of the storage device and sliding on the guideway;
    a second slider attached to an apposite side of the storage device and sliding under the rail, wherein the second slider forms a horizontal strip sliding along the rail of the bracket, and a vertical strip attached to said opposite side of the storage device; and
    a securing means fixedly securing the storage device in the bracket.

11. The storage device mounting apparatus assembly as described in claim 10, wherein the bracket comprises a front plate, and the front plate defines an opening for access of the storage device therethrough.

12. The storage device mounting apparatus assembly as described in claim 10, wherein a stop is formed on the bracket in general alignment with the rail, and a cutout is defined in an end of the second slider for engagingly receiving the stop.

13. The storage device mounting apparatus assembly as described in claim 10, wherein the bracket comprises a bottom plate, and the guideway is formed on the bottom plate for slidably supporting the first slider.

14. The storage device mounting apparatus assembly as described in claim 10, wherein the first slider forms a horizontal strip sliding along the guideway, a vertical strip attached to said one side of the storage device, and the horizontal skip defining a through hole therein.

15. The storage device mounting apparatus assembly as described in claim 14, wherein the guideway defines a securing hole therein, and the securing means comprises a thumbscrew extending through the through hole of the first slider to engage in the securing hole of the guideway.

16. The storage device mounting apparatus assembly as described in claim 10, wherein the guideway defines an aperture therein and a catch is formed on the first slider, the catch engaging in the aperture for preventing over-insertion of the storage device into the bracket.

17. A storage device assembly comprising:
    a bracket;
    a guideway formed on the bracket, said guideway is raised from a bottom plate of the bracket;
    a storage device;
    a cutout defined around a corner of said storage device; and
    a slider attached to a side of the storage device; wherein said slider associated with the storage device, moves along said guideway in a front-to-back direction, and defines a screw hole through which a screw extends and is fastened to the guideway under a condition that said screw is vertically exposed to an exterior via said cutout for accessible operation.

18. The assembly as described in claim 17, wherein said bracket includes a front plate with an opening therein, said guideway is essentially aligned with an side edge portion of the opening in said front-to-back direction so that said storage device is inserted into the opening along said front-to-back direction and defines a transverse dimension similar to a lengthwise dimension of the opening.

* * * * *